United States Patent
Gelber et al.

(10) Patent No.: US 10,477,624 B2
(45) Date of Patent: Nov. 12, 2019

(54) SYSTEMS AND METHODS OF QUASI-RESONANT INDUCTION HEATING

(71) Applicant: General Electric Company, Schenectady, NY (US)

(72) Inventors: Scott Michael Gelber, Athens, AL (US); William Hull Bicknell, Louisville, KY (US); Mingwei Shan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 751 days.

(21) Appl. No.: 15/097,593

(22) Filed: Apr. 13, 2016

(65) Prior Publication Data

US 2017/0303345 A1  Oct. 19, 2017

(51) Int. Cl.
*H05B 6/06* (2006.01)
*H02M 7/537* (2006.01)
*H02M 7/48* (2007.01)

(52) U.S. Cl.
CPC ............ *H05B 6/062* (2013.01); *H02M 7/537* (2013.01); *H02M 2007/4815* (2013.01); *Y02B 70/1441* (2013.01)

(58) Field of Classification Search
CPC .................. H05B 6/062; H02M 7/537; H02M 2007/4815; Y02B 70/1441
USPC ....... 219/608, 618, 620, 621, 622, 623, 624, 219/625, 626, 627, 660, 663–667, 492, 219/494, 497, 488; 363/64, 131, 12.01, 363/12.03, 97, 98, 132, 135, 137, 138, 83
See application file for complete search history.

(56) References Cited

U.S. PATENT DOCUMENTS

| 2009/0206804 | A1 | 8/2009 | Xu et al. | |
| 2011/0242868 | A1* | 10/2011 | Gray | H02M 7/537 363/131 |
| 2014/0078782 | A1* | 3/2014 | Rosado | H02M 3/33584 363/17 |
| 2016/0095168 | A1* | 3/2016 | Shan | H05B 6/062 219/626 |

* cited by examiner

*Primary Examiner* — Quang T Van
(74) *Attorney, Agent, or Firm* — Dority & Manning, P.A.

(57) ABSTRACT

Systems and methods of quasi-resonant induction heating are provided. In particular, an induction heating system having a quasi-resonant topology can have a quasi-resonant inverter. The inverter can include an induction heating coil configured to inductively head a load with a magnetic field, and a power supply circuit configured to supply a power signal to the induction heating coil. The inverter can further include a first switching element and a second switching element coupled in parallel with the first switching element. The inverter can further include a resonant capacitor coupled in parallel with the induction heating coil. The inverter can further include one or more control devices configured to control operation of the first and second switching elements to regulate an amount of current provided to the induction coil based at least in part on a desired operating frequency associated with the quasi-resonant inverter.

13 Claims, 2 Drawing Sheets

SYSTEMS AND METHODS OF QUASI-RESONANT INDUCTION HEATING

FIELD OF THE INVENTION

The present subject matter relates generally induction heating systems, and more particularly to induction heating systems having quasi-resonant topologies.

BACKGROUND OF THE INVENTION

Induction cooking appliances are more efficient, have greater temperature control precision and provide more uniform cooking than other conventional cooking appliances. In conventional cooktop systems, an electric or gas heat source is used to heat cookware in contact with the heat source. This type of cooking is inefficient because only the portion of the cookware in contact with the heat source is directly heated. The rest of the cookware is heated through conduction that causes non-uniform cooking throughout the cookware. Heating through conduction takes an extended period of time to reach a desired temperature.

In contrast, induction cooking systems use electromagnetism which turns cookware of the appropriate material into a heat source. A power supply provides a signal having a frequency to the induction coil. When the coil is activated a magnetic field is produced that induces a current on the bottom surface of the cookware. The induced current on the bottom surface then induces even smaller currents (Eddy currents) within the cookware thereby providing heat throughout the cookware.

FIG. 1 depicts a schematic of a typical quasi-resonant inverter 100 for use in an induction heating system. As illustrated, inverter 100 includes an induction heating coil 102 that receives power from an AC source 104 by way of a rectifier 106. Induction heating coil 102 can be controlled by operation of a switching element 108. Switching element 108 in turn is controlled by one or more control devices that provide control signals to switching element 108. For instance, the control signals can be determined based at least in part on one or more feedback signals or other control signals provided from a controller associated with inverter 100.

In general, switching element 108 corresponds to the active component of a quasi-resonant inverter, which can be controlled in a known manner by the one or more control devices to provide power to induction heating coil 102 and/or a load (not shown), such as any vessel (e.g. cooking utensil) or object located on a cooktop proximate induction heating coil 102, and/or magnetically coupled to induction heating coil 102.

Operation of inverter 100 (or similar quasi-resonant inverter) in an induction heating system may produce substantial thermal stresses on switching element 108 due at least in part to temperature rise in the switch junctions of switching element 108. Such thermal stress may prevent inverter 100 from operating switching element 108 at a high duty cycle, and thereby from transmitting a maximum (or near maximum) amount of available power to the load.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to an induction heating system having a quasi-resonant topology. The induction heating system includes a quasi-resonant inverter. The quasi-resonant inverter includes an induction heating coil configured to inductively heat a load with a magnetic field. The quasi-resonant inverter further includes a power supply circuit configured to supply a power signal to the induction heating coil. The quasi-resonant inverter further includes a first switching element and a second switching element coupled in parallel with the first switching element. The quasi-resonant inverter further includes a resonant capacitor coupled in parallel with the induction heating coil. The quasi-resonant inverter further includes one or more control devices associated with the quasi-resonant inverter. The one or more control devices are configured to control operation of the first and second switching elements to regulate an amount of current provided to the induction coil based at least in part on a desired operating frequency associated with the quasi-resonant inverter.

Another example aspect of the present disclosure is directed to a method of controlling an induction heating system having a quasi-resonant topology. The method includes receiving a user input indicative of an output level of an induction heating system having a quasi-resonant topology. The induction heating system includes a first switching element and a second switching element coupled in parallel. The method further includes determining an operating frequency at which to operate the induction heating system based at least in part on the user input. The method further includes controlling the first switching element to turn on during a first time period based at least in part on the determined operating frequency. The method further includes controlling the second switching element to turn on during a second time period based at least in part on the determined operating frequency.

Yet another example aspect of the present disclosure is directed to a quasi-resonant inverter for use in an induction heating system. The quasi-resonant inverter includes an induction heating coil configured to inductively heat a load with a magnetic field. The quasi-resonant inverter further includes a power supply circuit configured to supply a power signal to the induction heating coil. The quasi-resonant inverter further includes a first switching element and a second switching element coupled in parallel with the first switching element. The quasi-resonant inverter further includes a resonant capacitor coupled in parallel with the induction heating coil. The quasi-resonant inverter further includes one or more control devices associated with the quasi-resonant inverter. The one or more control devices are configured to control operation of the first and second switching elements to regulate an amount of current provided to the induction coil based at least in part on a desired operating frequency associated with the quasi-resonant inverter.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
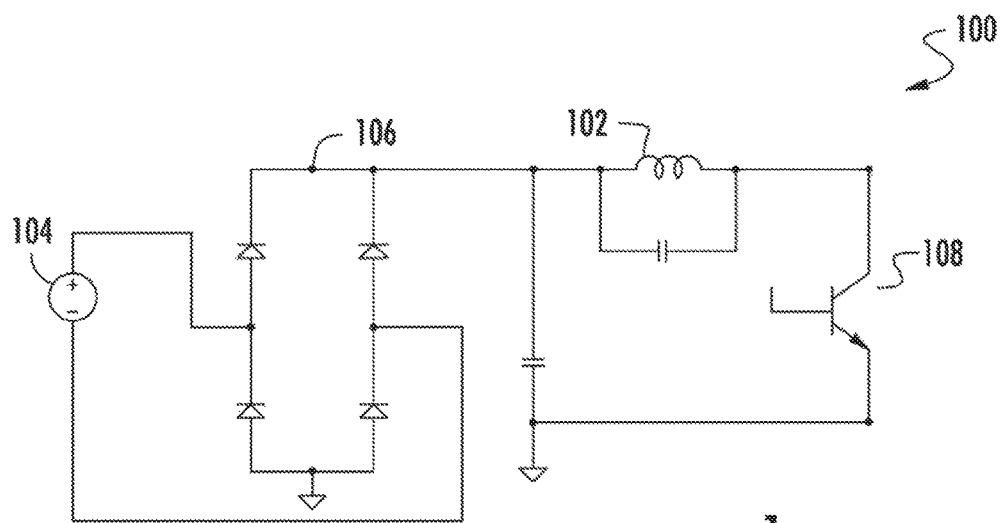
FIG. 1 depicts a schematic of a typical quasi-resonant inverter for use in an induction heating system.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to controlling an induction heating system having a quasi-resonant topology with multiple switching elements coupled in parallel. For instance, the induction heating system can include a power supply configured to provide a signal to an induction coil by way of a rectifier circuit and a quasi-resonant inverter circuit. The induction coil can be configured to induce a current in a load when located on the cooktop. The quasi-resonant inverter can include a resonant circuit having an inductor and a capacitor. The quasi-resonant inverter can further include two or more switching elements coupled in parallel. In some implementations, the switching elements can be insulated-gate bipolar transistors or other switching elements.

Each switching element can have an independent gate driver configured to provide one or more control signals to the gate of the switching element, thereby controlling operation of the switching element. In some implementations, the switching elements can be controlled such that a maximum of one switching element is turned on at any time. In this manner, the "on-time" of the switching elements can be reduced, thereby reducing the thermal stress experienced by the switching elements.

In some implementations, operation of the switching elements can be controlled using various suitable control techniques, such as a zero voltage switching technique, a zero current switching technique, and/or other control technique. In this manner, the independent gate drivers may initiate gate pulses in accordance with such control techniques (e.g. at a zero crossing event). The gate pulses can cause the corresponding switching elements to "turn-on," causing the switching elements to conduct current. In some implementations, the length of the gate pulses may be determined based at least in part on a current through the inductor of the resonant circuit.

As will be understood by those skilled in the art, the resonant circuit can act as an oscillator to generate an alternating current signal. In this manner, the quasi-resonant inverter may operate in a plurality of charging phases and a plurality of resonant phases. In particular, energy from the power supply can be stored by the resonant inductor during the plurality of charging phases, and the stored energy can oscillate between the resonant inductor and the resonant capacitor during the plurality of resonant phases. Such oscillation can produce an alternating current signal in the induction cooking appliance that can, in turn, induce an electromotive force in the load. The charging and resonant phases can correspond at least in part to the operation of the switching elements. For instance, each charging phase can approximately correspond to a period of time wherein one of the switching elements is turned on. Similarly, each resonant phase can approximately correspond to a period of time wherein each switching element is turned off.

To properly drive an induction coil using a resonant power inverter it is important to have an accurate assessment of the resonant frequency of the resonant power inverter being used to drive the induction coil. In particular, the output power of the induction coil is a function of the input, the coil inductance, vessel resistance and resonant frequency of the system. The closer the system is driven to resonant frequency, the more power can be delivered to the system. Maximum output occurs at resonance and subsequently lower power levels are driven away from resonance accordingly.

It is advantageous to operate the resonant power inverter at resonance or above resonance for many reasons. For instance, operating at resonance provides maximum power transfer between the induction heating coil and the vessel on the induction heating coil. If reduced power on the induction heating coil is desired, it is advantageous to drive the frequency above resonance. Operating below resonance results in greater switching losses, leading to reduced efficiency. Moreover, operating below resonance risks entering into the human audible hearing range, leading to undesirable operating conditions.

In some implementations, the switching elements can be controlled in an alternating manner to achieve a desired power output and/or operating frequency of the inverter. For instance, the switching elements can be controlled such that a first switching element is turned on during a first time period, and a second switching element is subsequently turned on during a second time period. In this manner, the first switching element can be turned on to allow the resonant inductor to charge. When the current through the resonant inductor reaches a desired and/or peak level, the first switching element can be turned off to allow current to oscillate between the resonant inductor and the resonant capacitor. Subsequently, the second switching element can be turned on to allow the resonant inductor to recharge due to damping effects associated with the oscillation of current between the resonant capacitor and the resonant inductor.

Controlling the operation of multiple parallel switching elements according to example embodiments of the present disclosure can reduce the duty cycle of each individual switching element. In this manner, the temperatures generated by operation of the switching elements can be reduced, thereby reducing the thermal stresses experienced by the switching elements. In addition, such multiple switching element, quasi-resonant topology can allow the system to transmit more available power to the load by allowing for an increased overall system duty cycle associated with the switching elements (e.g. increased combined on-time for the switching elements).

Figure 2:
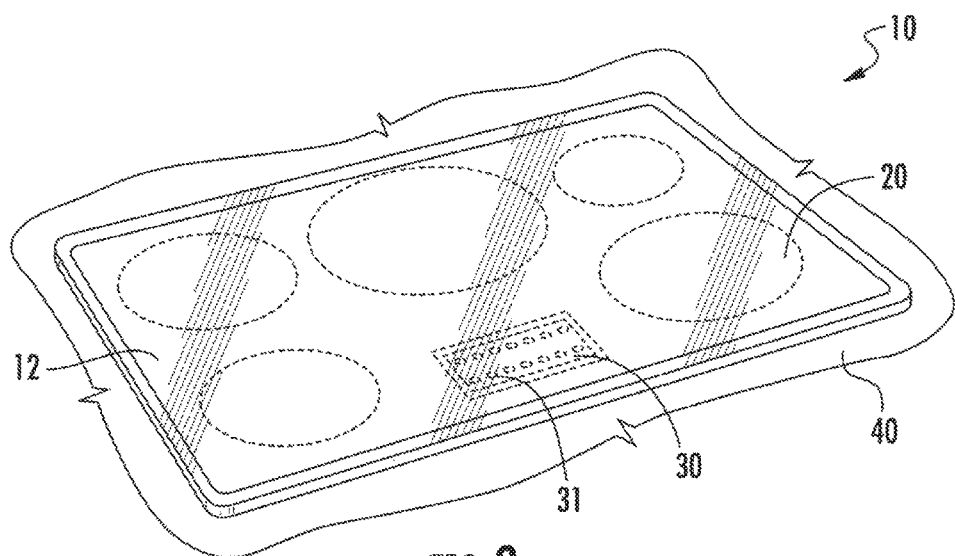
FIG. 2 depicts an example induction cooktop appliance according to example embodiments of the present disclosure.

Referring now to the figures, example aspects of the present disclosure will be discussed in greater detail. For instance, FIG. 2 depicts an example induction cooking appliance 10 according to example embodiments of the present disclosure. Cooktop 10 may be installed in a chassis 40 and in various configurations such as in cabinetry in a kitchen, coupled with one or more ovens or as a stand-alone appliance. Chassis 40 may be grounded. Cooktop 10 includes a horizontal surface 12 that may be glass or other suitable material. Induction coil 20 may be provided below horizontal surface 12. It may be understood that cooktop 10 may include a single induction coil or a plurality of induction coils.

Cooktop 10 is provided by way of example only. The present invention may be used with other configurations. For example, a cooktop having one or more induction coils in combination with one or more electric or gas burner assemblies. In addition, the present invention may also be used with a cooktop having a different number and/or positions of burners.

A user interface 30 may have various configurations and controls may be mounted in other configurations and locations other than as shown in FIG. 2. In the illustrated embodiment, the user interface 30 may be located within a portion of the horizontal surface 30, as shown. Alternatively, the user interface may be positioned on a vertical surface near a front side of the cooktop 10 or other suitable location. The user interface 30 may include, for instance, a capacitive touch screen input device component 31. The input component 31 may allow for the selective activation, adjustment or control of any or all induction coils 20 as well as any timer features or other user adjustable inputs. One or more of a variety of electrical, mechanical or electro-mechanical input devices including rotary dials, push buttons, and touch pads may also be used singularly or in combination with the capacitive touch screen input device component 31. The user interface 30 may include a display component, such as a digital or analog display device designed to provide operational feedback to a user.

Figure 3:
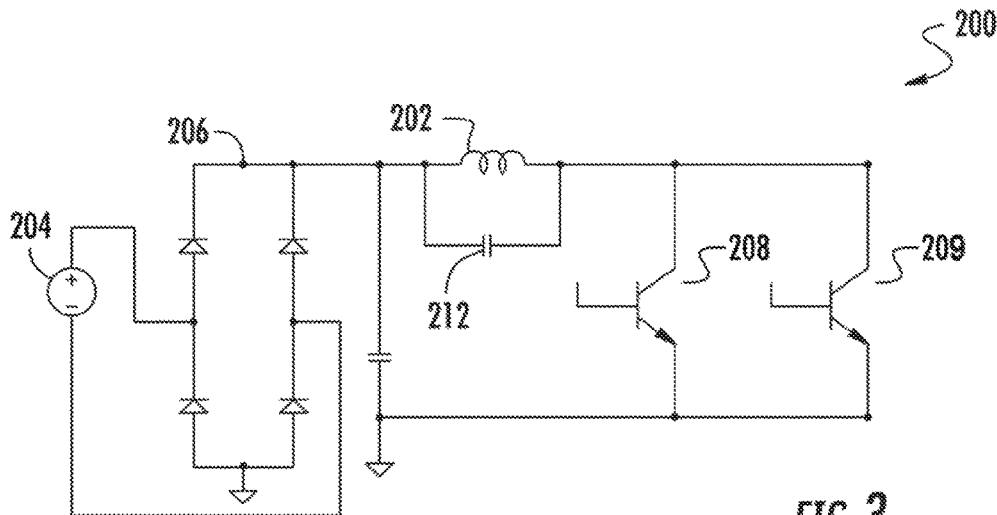
FIG. 3 depicts a schematic of an example quasi-resonant inverter for use in an induction heating system according to example embodiments of the present disclosure.

FIG. 3 depicts a schematic of an example quasi-resonant inverter 200 for use in an induction heating system according to example embodiments of the present disclosure. Similar to inverter 100 of FIG. 1, inverter 200 includes an induction heating coil 202 configured to receive one or more power signals from an AC source 204 by way of a rectifier 206. Although rectifier 206 is a full-wave bridge rectifier, it will be appreciated that any suitable rectifier can be included in inverter 200 without deviating from the scope of the present disclosure.

Inverter 200 further includes two switching elements 208 and 209 coupled in parallel. Switching elements 208, 209 can be IGBTs, MOSFETS, BJTs, or other suitable switching elements. It will be appreciated that inverter 200 can include more than two switching elements, such as three switching elements, four switching elements, etc. In some implementations, switching elements 208, 209 can have associated flyback diodes coupled in parallel to the respective switching elements. Switching elements 208, 209 can control operation of induction heating coil 202. In particular, switching elements 208, 209 can receive control commands from one or more control devices, such as one or more gate drivers. For instance, the control commands can be determined based at least in part on one or more switching control signals provided from a controller. In some implementations, each switching element 208, 209 can receive control signals from an independent control device. The control signals can cause switching elements 208, 209 to turn on or off during one or more time periods, such that induction heating coil 202 produces a desired amount of output power.

The controller can include a memory and one or more processing devices such as microprocessors, CPUs or the like, such as general or special purpose microprocessors operable to execute programming instructions or microcontrol code associated with operation of an induction cooktop appliance or other induction heating system. The memory can represent random access memory such as DRAM, or read only memory such as ROM or FLASH. In one embodiment, the processor executes programming instructions stored in memory. The memory can be a separate component from the processor or can be included onboard within the processor. Alternatively, the controller might also be constructed without using a microprocessor, using a combination of discrete analog and/or digital logic circuitry (such as switches, amplifiers, integrators, comparators, flip-flops, AND gates, and the like) to perform control functionality instead of relying upon software.

In some implementations, switching elements 208, 209 can be turned on and off in an alternating manner such that inverter 200 is operated at a desired operating frequency (e.g. at or above resonance frequency) and/or provides a desired amount of power to a load (not shown), such as any vessel (e.g. cooking utensil) or object magnetically coupled to induction heating coil 102. As described above, inverter 200 can be controlled to operate in a plurality of charging phases wherein induction heating coil 202 stores energy, and in a plurality of resonant phases wherein energy stored during the previous charging phase oscillates between induction heating coil 202 and resonant capacitor 212 to generate an alternating current signal. The charging phases can approximately correspond to the time periods wherein either switching element 208 or switching element 209 is turned on. The resonant phases can approximately correspond to the periods of time wherein both switching element 208 and switching element 209 are turned off.

In this manner, inverter 200 can be controlled such that current flows through switching element 208 during a first subset of charging phases, and not during a second subset of charging phases. Similarly, inverter 200 can be controlled such that current flows through switching element 209 during the second subset of charging phases and not during the first subset of charging phases. In some implementations, the first and second charging phase subsets can be distributed in an alternating manner. It will be appreciated that various other suitable distribution schemes can be used.

For instance, during a first charging phase of inverter 200, switching element 208 can be turned on (e.g. by applying a sufficient gate voltage to switching element 208) during a first time period to allow induction heating coil 202 to charge to a sufficient level. Switching element 208 can then be turned off to allow the energy stored by induction heating coil 202 during the first charging phase to oscillate (e.g. during a first resonant phase of inverter 200) between induction heating coil 202 and a resonant capacitor 212, such that an alternating current signal is produced, thereby inducing a voltage in the load. In particular, induction heating coil 202 and resonant capacitor 212 can correspond to a resonant tank circuit. Subsequently, during a second charging phase of inverter 200, switching element 209 can be turned on (e.g. by applying a sufficient gate voltage to switching element 209) during a second time period to allow induction heating coil 202 to re-charge to a sufficient level. Switching element 208 can then be turned off to allow the energy stored in induction heating coil 202 during the second charging phase to oscillate (e.g. during a second resonant phase of inverter 200) between induction heating coil 202 and a resonant capacitor 212, such that an alternating current signal is again produced, thereby inducing a voltage in the load.

As indicated above, switching elements 208 and 209 can be controlled such that the two switching elements are never on simultaneously. In particular, switching elements 208 and 209 can be controlled such that when switching element 208 is on, switching element 209 is off, and vice-versa. In this manner, operation of switching elements 208 and 209 can be controlled such that they do not simultaneously conduct current.

Operation of switching elements 208, 209 can be further controlled in accordance with various suitable control schemes or techniques. For instance, in some implementations, operation of switching elements 208, 209 can be controlled in accordance with a zero-voltage switching technique, zero-current switching technique or other switching technique. In this manner, one or more control signals can be initiated at a zero-crossing event (e.g. zero-voltage crossing, zero-current crossing, etc.) associated with AC source 204 and provided to switching device 208 or 209. The control signals can be pulses having a sufficient voltage to cause the switching device to turn on. The length of the pulses can be determined to facilitate operation of inverter 200 at a desired operating frequency. In particular, the length of the pulses can be determined based at least in part on the inductance of induction heating coil 202, the capacitance of resonant capacitor 212, the resonant frequency of inverter 200, a desired peak current level associated with induction heating coil 202, one or more user inputs indicative of a desired temperature or output level, a resistance associated with the load (e.g. resistance of a vessel or other cooking utensil) and/or other suitable signals. For instance, the one or more user inputs can be provided through user interaction with user interface 30 and/or input component 31 depicted in FIG. 2.

Figure 4:
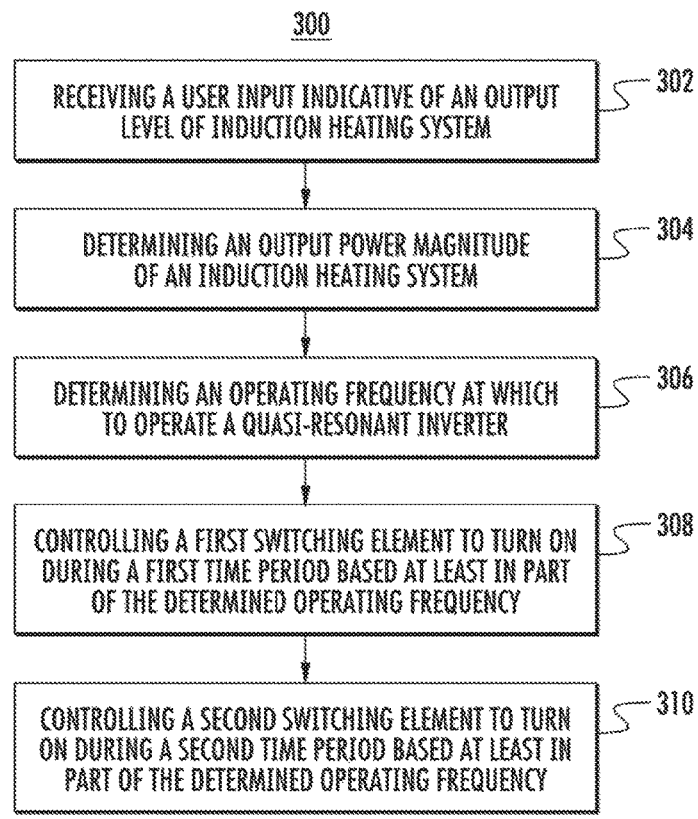
FIG. 4 depicts a flow diagram of an example method of controlling an induction heating system having a quasi-resonant topology according to example embodiments of the present disclosure.

FIG. 4 depicts a flow diagram of an example method (300) of controlling an induction heating system according to example embodiments of the present disclosure. Method (300) can be implemented by one or more computing devices. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include receiving a user input indicative of an output level of an induction heating system. For instance, the user input can be provided through a user interface associated with the heating system. The input can be associated with a temperature or power level desired by the user. The induction heating system can include a quasi-resonant topology corresponding to that depicted in FIG. 3.

At (304), method (300) can include determining an output power magnitude based at least in part on the user input. For instance, the output power magnitude can be an amount of power required to heat a load to the desired temperature. For instance, the output power can be determined based at least in part on the input power signal, the coil inductance, vessel resistance, the resonant frequency of the system, etc.

At (306), method (300) can include determining an operating frequency at which to operate the quasi-resonant inverter based at least in part on the determined output power magnitude. As indicated above, it can be advantageous to operate the quasi-resonant inverter at or above resonant frequency. Accordingly, the operating frequency can be determined to correspond to a frequency at or above resonant frequency that allows for the determined power output.

At (308), method (300) can include controlling a first switching element to turn on during a first time period based at least in part on the determined operating frequency. As indicated above, the first switching element can be configured to turn on to allow the induction heating coil of the heating system to store a suitable amount of energy. In this manner, the first time period can be determined based at least in part on the determined output power, the determined operating frequency, and/or the inductance of the induction heating coil.

At (310), method (300) can include controlling a second switching element to turn on during a second time period based at least in part on the determined operating frequency. The first time period can be determined based at least in part on the determined output power, the determined operating frequency, and/or the inductance of the induction heating coil.

As indicated above, the first and second switching elements can be controlled in an alternating manner to allow the induction heating coil to charge during various suitable time periods. Controlling the first and second switching elements in this manner, can reduce the individual duty cycles of each switching element. For instance, the duty cycle of each switching element can be reduced by 50%. In this manner, the junction heat rise caused by rapidly switching the switching elements on and off can be reduced, leading to less thermal stress experienced by the switching elements. Such reduced thermal stress can allow the heating system to transmit more available power to the load. For instance, the switching elements can be controlled such that the combined duty cycle (e.g. the percentage of a period that either switch is turned on) of the system increases compared to a single switching element implementation. For instance, in some implementations, operation of multiple switching elements can controlled to correspond to a 100% duty cycle of a single switching element.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. An induction heating system having a quasi-resonant topology comprising:
   a quasi-resonant inverter comprising:
     an induction heating coil configured to inductively heat a load with a magnetic field;
     a power supply circuit configured to supply a power signal to the induction heating coil;
     a first switching element;

a second switching element coupled in parallel with the first switching element; and a resonant capacitor coupled in parallel with the induction heating coil; and one or more control devices associated with the quasi-resonant inverter, the one or more control devices configured to control operation of the first and second switching elements to regulate an amount of current provided to the induction coil based at least in part on a desired operating frequency associated with the quasi-resonant inverter, and wherein operation of the first and second switching elements are controlled such that the first switching element is turned on during a first subset of charging periods associated with the quasi-resonant inverter.

2. The induction heating system of claim 1, wherein the first and second switching elements are controlled in an alternating manner.

3. The induction heating system of claim 1, wherein the quasi-resonant inverter is configured to operate in a plurality of charging phases and a plurality of resonant phases.

4. The induction heating system of claim 3, wherein the one or more control devices are configured to control operation of the first and second switching elements by turning on the first switching element during a first time period and then subsequently turning on the second switching element during a second time period.

5. The induction heating system of claim 4, wherein the first time period corresponds to a first charging phase and the second time period corresponds to a second charging phase.

6. The induction heating system of claim 3, wherein each charging phase corresponds to a period of time wherein the induction heating coil stores energy provided by the power supply circuit.

7. The induction heating system of claim 6, wherein each resonant phase corresponds to a period of time wherein the energy stored in the induction heating coil oscillates between the induction heating coil and the resonant capacitor.

8. The induction heating system of claim 3, wherein operation of the first and second switching elements are controlled such that the second switching element is turned on during a second subset of charging periods.

9. The induction heating system of claim 8, wherein operation of the first and second switching elements are controlled such that the first switching element is turned off during the second subset of charging periods, and the second switching element is turned off during the first subset of switching periods.

10. The induction heating system of claim 1, further comprising a rectifier circuit coupled between the power supply circuit and the induction heating coil.

11. The induction heating system of claim 1, wherein the first and second switching elements comprise insulated-gate bipolar transistors.

12. A quasi-resonant inverter for use in an induction heating system, the quasi-resonant inverter comprising:

an induction heating coil configured to inductively heat a load with a magnetic field;

a power supply circuit configured to supply a power signal to the induction heating coil;

a first switching element;

a second switching element coupled in parallel with the first switching element; and a resonant capacitor coupled in parallel with the induction heating coil; and one or more control devices associated with the quasi-resonant inverter, the one or more control devices configured to control operation of the first and second switching elements to regulate an amount of current provided to the induction coil based at least in part on a desired operating frequency associated with the quasi-resonant inverter, and wherein the one or more control devices are configured to control operation of the first switching element to turn on during a first subset of charging phases associated with the quasi-resonant inverter.

13. The quasi-resonant inverter of claim 12, wherein the one or more control devices are configured to control operation of the second switching element to turn on during a second subset of charging phases associated with the quasi-resonant inverter.

* * * * *